United States Patent [19]
Oshida

[11] 3,963,164
[45] June 15, 1976

[54] METHOD FOR BONDING BODIES MADE OF METALLIC MATERIALS
[75] Inventor: Yoshiki Oshida, Yokohama, Japan
[73] Assignee: Mitsubishi Jukogyo Kabushiki Kaisha, Tokyo, Japan
[22] Filed: Jan. 13, 1975
[21] Appl. No.: 549,412

[52] U.S. Cl............................ 228/217; 228/239
[51] Int. Cl.² .................. B23K 13/00; B23K 19/00
[58] Field of Search ........... 228/214, 217, 173, 238, 228/239, 234, 243

[56] References Cited
UNITED STATES PATENTS

| | | | |
|---|---|---|---|
| 2,159,043 | 5/1939 | Orr, Jr. ............................ | 228/214 X |
| 3,435,182 | 3/1969 | Rietsch ....................... | 148/11.5 R X |
| 3,535,908 | 10/1970 | Hymes et al. .................... | 228/173 X |
| 3,537,171 | 11/1970 | Wilson et al. ...................... | 228/114 |
| 3,591,916 | 7/1971 | Arthur ........................ | 148/11.5 R X |
| 3,678,570 | 7/1972 | Pavlonis et al. ................. | 228/263 X |
| 3,713,207 | 1/1973 | Ruckle et al. ................... | 228/263 X |

Primary Examiner—Al Lawrence Smith
Assistant Examiner—K. J. Ramsey
Attorney, Agent, or Firm—Cushman, Darby & Cushman

[57] ABSTRACT

A method for bonding bodies made of metallic materials is described herein, which method is characterized in that said metallic bodies are pressure bonded to each other by making use of super-plastic phenomena which are generated by subjecting the bonding portions of the metallic bodies to be bonded to a heating and cooling temperature cycle under the state where a bonding insert material that can form a reducible atmosphere upon bonding is sandwiched between the bonding surfaces of the metallic bodies to be bonded.

8 Claims, 1 Drawing Figure

U.S. Patent  June 15, 1976  3,963,164
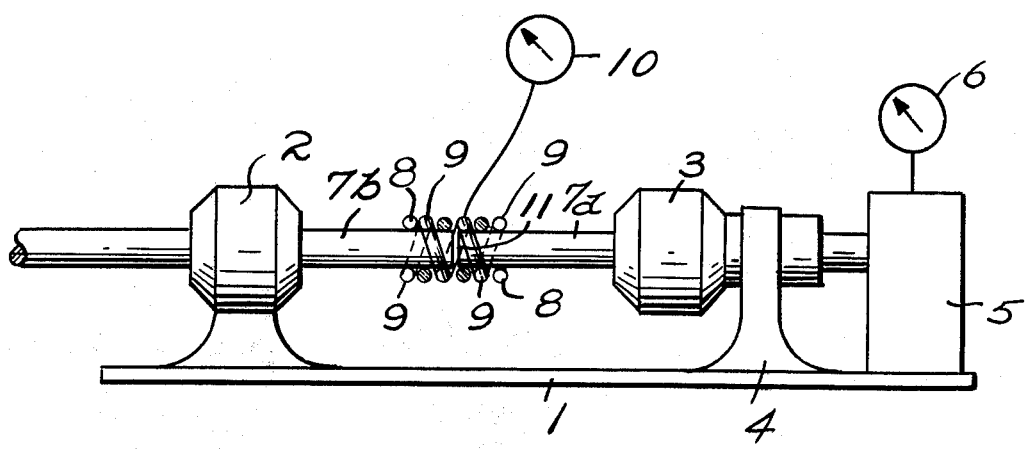

METHOD FOR BONDING BODIES MADE OF METALLIC MATERIALS

The present invention relates to a method for bonding bodies made of metallic materials.

Heretofore, in the super-plastic pressure bonding or diffusion bonding there were various problems with respect to treatment of the bonding surfaces, and in order to bond the metallic bodies without being preliminarily treated, they had to be bonded by applying strong compression stress.

The present invention has been worked out in view of the background of the art as described above, and it is one object of the present invention to provide a method for bonding bodies made of metallic materials in which the compression stress to be applied upon bonding is reduced and also the metallic bodies can be bonded strongly.

According to one feature of the invention, the method for bonding metallic bodies is characterized in that the metallic bodies to be bonded are pressure bonded by making use of superplastic phenomena which are generated by subjecting the bonding portions of the metallic bodies to be bonded to a heating and cooling temperature cycle under the state where a bonding insert material that can form a reducible atmosphere upon bonding is sandwiched between the bonding surfaces of the metallic bodies to be bonded.

For instance, upon pressure bonding iron steel of Fe-C series alloy, in order to remove an oxide layer formed on the bonding surface and to prevent oxide from being produced upon bonding, the iron steel bodies are pressure bonded by making use of superplastic phenomena with a small amount of carbon powder serving as a bonding insert material sandwiched between the bonding surfaces. Then a reducible atmosphere can be formed between the bonding surfaces, so that poor bonding due to existence of oxide would not occur and also the diffusion of the carbon element into the matrices on the opposite sides of the bonding surface is promoted, resulting in strong bonding and lowering of the compression stress necessitated upon bonding.

It is to be noted that upon pressure bonding an aluminum series of metals it is only necessary to dispose a bonding insert material which can form a reducible atmosphere against aluminum oxides between the bonding surfaces, and that the method according to the present invention is, of course, applicable to other materials to be bonded without modifying the essence of the invention.

Therefore, according to the present invention, there is provided an industrially useful method for bonding metallic bodies that is practiceable in bonding of knurled pipes, boiler steel pipes, cast iron parts, etc.

Above-mentioned and other features and objects of this invention will become more apparent by reference to the following description taken in conjunction with the accompanying drawing consisting of a single FIGURE, which is a front view showing one example of bonding apparatuses to be used for practicing the method according to the present invention.

Now one preferred embodiment of the invention will be described in detail with reference to the drawing.

In the FIGURE, at one end portion of a base frame 1 is mounted a chuck 2, and at the other end portion is mounted via a support leg 4 another chuck 3 as opposed to the chuck 2 in a slidable manner in the axial direction.

The chuck 3 is coupled to a hydraulic device 5, and the compression stress in the axial direction is adapted to be indicated by a pressure gauge 6 of the hydraulic device 5. A heating device 8 and a cooling device 9 are disposed at a bonding portion of metallic bodies 7a and 7b to be bonded. In addition, a thermo-couple type of thermometer 10 is connected to the bonding portion so that the temperature at the bonding portion may be measured. A bonding insert material 11 is adapted to be sandwiched between the metallic bodies 7a and 7b at the bonding portion. This bonding insert material 11 could be carbon in case that the metallic bodies 7a and 7b are made of Iron-Carbon series material, or else it could be a mixture of iron and carbon of the same composition as the metallic bodies 7a and 7b. The above-mentioned insert material can be easily disposed between the bonding surfaces by mixing it with soldering paste to form a paste-like material.

In operation, one of the metallic bodies 7a is grasped by the chuck 3, the other metallic body 7b being grasped by the chuck 2, and while compression stress is being exerted upon the bonding surfaces by means of the hydraulic device 5, the bonding portion of the metallic bodies 7a and 7b is subjected to a heating and cooling temperature cycle by alternately and repeatedly actuating the heating device 8 and the cooling device 9, and thereby the metallic bodies 7a and 7b are bonded to each other.

Carrying out the above-described process, upon pressure bonding as described above, even if unbonded portion should exist on the bonding surface and even if that portion is subjected to a high temperature, oxides which are undesirable for bonding would not be produced because that portion is surrounded by a reducible atmosphere. Accordingly, the compression stress necessitated upon bonding can be lowered, and furthermore, since the bonding insert material 11 diffuses into the matrices on the opposite sides of the bonding surface, the established bonding would be a strong one.

TEST EXAMPLE

Employing SS41 soft steel (Fe-0.3%C) as the material to be bonded according to the present invention, test samples pressure bonded according to the present invention employing carbon as the insert material and imploying SS41 soft steel as the insert material, pressure bonded in a similar process to the present invention buy not employing the insert material, and made of SS41 soft steel itself without being bonded, respectively, were prepared.

The heating and cooling temperature cycle upon bonding was a triangular waveform temperature cycle including the transformation points (723°C and 850°C) and having its upper limit at 950°C and its lower limit at 600°C. The heating and cooling were conducted for five cycles in one minute, and compression stress of 2 kg/mm² was applied.

A result of a tensile strength test for the above-referred test samples is shown in TABLE-1 below:

TABLE 1

| Test Samples | Maximum Tensile Strength (kg/mm²) |
| --- | --- |
| Bonded SS41 with Carbon Insert Material (Compression Stress: 2 kg/mm²) | 46.82 |

TABLE 1-continued

| Test Samples | Maximum Tensile Strength (kg/mm²) |
| --- | --- |
| Bonded SS41 with (Fe-0.3%C) Insert Material (Compression Stress: 2 kg/mm²) | 45.17 |
| Bonded SS41 without Insert Material (Compression Stress: 2 kg/mm²) | 43.02 |
| Unbonded SS41 Soft Steel | 42.32 |

In the above-described embodiment, the upper and lower limits of the temperature range in the temperature cycle are preset at about ±120°C with respect to the transformation point and the frequency of the temperature cycle is preset at five cycles/minute. The reasons why such values were selected are because the variations of the transformation point caused by the changes in the heating and cooling speeds and the time required from the commencement to termination of the transformation were taken into consideration. Upon practicing the present invention, the conditions for the temperature cycle passing up and down through the transformation point so as to generate super-plastic phenomena such as, for example, the temperature range, the frequency and the like can be selected at appropriate values depending upon the nature and shape of the metallic bodies to be bonded. The stress to be loaded could be about 1/10 – 1/30 of the yielding point (maximum durable stress) of the metallic material.

As will be obvious from the test result shown in TABLE-1 above, according to the bonding method of the present invention, the bonding is strengthened in spite of the fact that the compression stress necessitated upon bonding is lowered.

While I have described above the principle of my invention in connection with specific apparatus and specific materials, it is to be clearly understood that this description is made only by way of example and not as a limitation to the scope of my invention as set forth in the accompanying claim.

What is claimed is:

1. A method for bonding bodies made of metallic materials, wherein the steps comprise:

sandwiching a bonding insert material that can form a reducible atmosphere upon bonding, between surfaces of portions of the metallic material to be bonded;

applying pressure to the metallic material and the insert material sufficient to pressure bond the material with super-plastic flow at heated temperature;

simultaneously with the application of pressure, alternately heating and cooling the metallic material and the insert material in the area where the bond is to be formed through a temperature range extending above and below the transformation temperature or temperatures of the metallic metal being bonded; and continuing said steps of applying pressure and alternately heating and cooling, for a time sufficient to form a permanent bond between the portions of metallic material.

2. A method as defined in claim 1 including:
using soft steel as both the bonding insert material and the metallic material.

3. A method as defined in claim 1 including:
using carbon as the bonding insert material and soft steel as the metallic material.

4. A method as defined in claim 2 wherein said step of applying pressure includes applying a pressure of 2Kg/mm² and said heating and cooling step includes alternately heating to a temperature of about 950°C and cooling to a temperature of about 600°C.

5. A method as defined in claim 4 wherein the step of alternately heating and cooling is cycled approximately five times per minute.

6. A method as defined in claim 1 wherein the temperature range is preset at about ± 120°C above and below the normal transformation point of the metallic material.

7. A method as defined in claim 1 wherein the pressure applied is selected from the range of pressure which will produce a stress in the metallic material in the range of about 1/10 – 1/30 of the yield point of the metallic material.

8. A method as defined in claim 1 including:
using an aluminum series of metal for the metallic material and a bonding insert material which can form a reducible atmosphere against aluminum oxides.

* * * * *